United States Patent
Aboulhosn et al.

(10) Patent No.: US 9,277,395 B2
(45) Date of Patent: Mar. 1, 2016

(54) METHOD FOR ACTIVATING AN UNLOCKED, INACTIVE MOBILE DEVICE USING A UNIVERSAL INTEGRATED CIRCUIT CARD PRE-PROVISIONED WITH A SERVICE PLAN

(71) Applicant: Roam Mobility Inc., Richmond (CA)

(72) Inventors: Amir Lawrence Aboulhosn, Vancouver (CA); Troy Bayne Kleweno, Redmond, WA (US)

(73) Assignee: Otono Networks Inc., Richmond (CA)

( * ) Notice: Subject to any disclaimer, the term of this patent is extended or adjusted under 35 U.S.C. 154(b) by 0 days.

(21) Appl. No.: 14/054,752

(22) Filed: Oct. 15, 2013

(65) Prior Publication Data

US 2014/0106728 A1    Apr. 17, 2014

Related U.S. Application Data

(60) Provisional application No. 61/819,982, filed on May 6, 2013, provisional application No. 61/713,454, filed on Oct. 12, 2012.

(51) Int. Cl.
   *H04W 4/00*          (2009.01)
   *H04W 8/20*          (2009.01)
   *H04W 88/04*        (2009.01)
   *H04W 8/26*          (2009.01)

(52) U.S. Cl.
   CPC .............. *H04W 8/205* (2013.01); *H04W 88/04* (2013.01); *H04W 8/265* (2013.01)

(58) Field of Classification Search
   CPC .............................. H04W 60/00; H04W 4/001
   USPC ....................................... 455/435.1, 419, 461
   See application file for complete search history.

(56) References Cited

U.S. PATENT DOCUMENTS

| | | | |
|---|---|---|---|
| 7,896,252 B2 * | 3/2011 | Narlinger et al. ............. 235/493 |
| 2004/0242209 A1 * | 12/2004 | Kruis et al. ................. 455/414.1 |
| 2006/0212482 A1 * | 9/2006 | Celik ................... H04M 1/2745 |
| 2008/0108334 A1 * | 5/2008 | Wang et al. ................. 455/414.1 |
| 2010/0121736 A1 * | 5/2010 | Kalke ............................ 705/27 |
| 2011/0159843 A1 * | 6/2011 | Heath et al. .................... 455/411 |
| 2012/0077496 A1 * | 3/2012 | Mathias et al. ............ 455/435.1 |
| 2012/0298736 A1 * | 11/2012 | Haddad ......................... 235/375 |
| 2012/0304312 A1 * | 11/2012 | Dong .................... G06F 9/4443 726/28 |
| 2013/0157716 A1 * | 6/2013 | Khan ............................ 455/551 |
| 2014/0011491 A1 * | 1/2014 | Zimmerman et al. ......... 455/419 |

FOREIGN PATENT DOCUMENTS

WO    WO 2009053918 A2 *    4/2009

* cited by examiner

*Primary Examiner* — David Q Nguyen
(74) *Attorney, Agent, or Firm* — Fenwick & West LLP

(57) ABSTRACT

A service plan is delivered to a mobile phone user without direct user communication with a mobile network operator or providing of personal details. A method comprises packaging a service plan, and at least one of a phone number and data plan, from a mobile network operator; associating the plan and phone number or data plan with a non-provisioned Universal Integrated Circuit Card; cueing service plan loading and activation of the UICC post purchase of the UICC by a user in communication with a provisioner by at least one of 1) product code scanning of the UICC and messages generated thereby; 2) automatic messaging generated by an activation application on the UICC; 3) user directed short messaging; 4) interactive voice responses between user and a provisioner system; 5) network detection software; 6) user interaction with a website; and 7) user entry of a zip code.

12 Claims, 4 Drawing Sheets

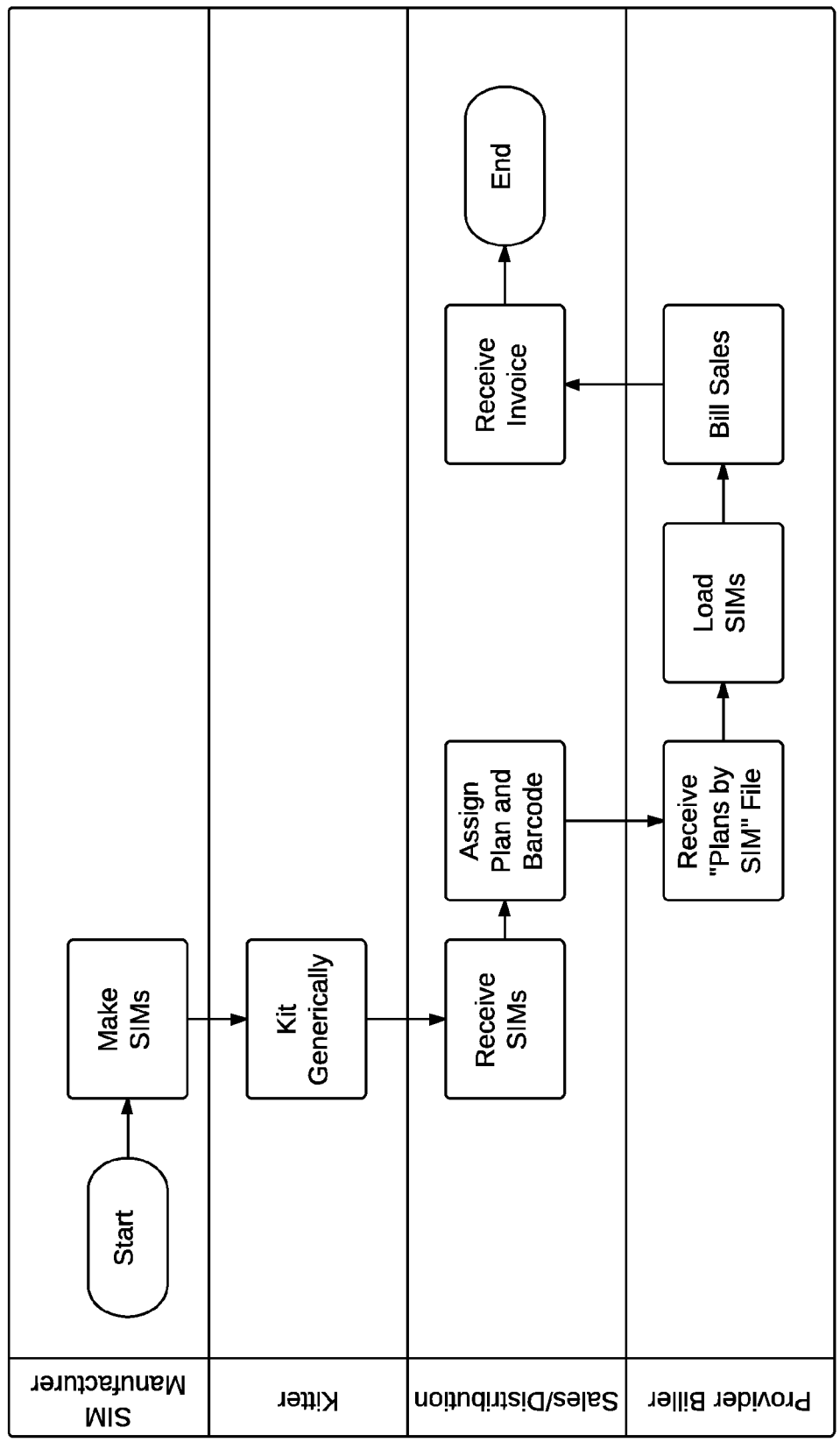
FIGURE 4 - SIM Load Process

METHOD FOR ACTIVATING AN UNLOCKED, INACTIVE MOBILE DEVICE USING A UNIVERSAL INTEGRATED CIRCUIT CARD PRE-PROVISIONED WITH A SERVICE PLAN

CROSS-REFERENCE TO RELATED APPLICATIONS

This application claimed the benefit of U.S. provisional applications 61/713,454, filed on Oct. 12, 2012, and 61/819,982, filed on May 6, 2013, each of which is incorporated by reference here in its entirety.

FIELD

This disclosure relates to the field of activation and provisioning for mobile wireless communications devices, such as mobile telephone or other devices supporting wireless communications.

BACKGROUND

In order to operate on a wireless network, a wireless device (which can include, but is not limited to a wireless phone) generally must be a subscriber on the network, (except for cases in which a wireless devices operates in a roaming mode on a foreign network). To identify the device to the network as a subscriber, a wireless provider generally undertakes a practice referred to herein as "activation," in which the phone is identified to the network using an identifier (such as an international mobile subscriber identifier ("IMSI") or similar identifying number, which, in many cases, is encoded on a subscriber identity module "SIM" in the wireless device). In a general sense, this process involves creating, in a home location register ("HLR"), a record for the device; in some cases, the record comprises the identifying number, as well as an addressing number (e.g., a phone number for a wireless phone), such as an international ISDN number ("MSISDN") or similar number. This record identifies the device to the network and provides information about the capabilities of the device. Without such a record in an HLR, the device generally will be inoperable on the wireless network.

Hence, when a user purchases a new wireless device, the user's wireless provider generally must activate the device before the user can use the device on the provider's network. There are, in general, three different ways in which a wireless device can be activated.

In the first case, the wireless device is preactivated prior to sale of the device to the user. This process is used most frequently for prepaid wireless phones. Under a preactivation scheme, the device has installed therein a SIM that is assigned an activated IMSI before the device ever is sold. This technique, while technically feasible, has several downsides. First, because the IMSI is assigned and activated before the device is sold, there is enhanced risk of theft and other supply-chain "leakage." Second, this technique requires substantial investment in allocating and activating IMSIs early in the supply chain, resulting in inefficiencies (for example, maintain a relatively large stock of activated IMSIs corresponding to devices that may not be sold or used for some time). Moreover, if the supply chain involves rebranding the devices, some of the allocated and activated IMSIs might never be used. Moreover, preactivation of a SIM generally requires the assignment of an MSISDN to the SIM (by associating the MSISDN with the IMSI assigned to the SIM). Given that IMSIs (and, especially, MSISDNs) can be relatively scarce resources, this solution is less than optimal.

In the second case, the wireless device is activated at the point of sale. While this technique is suitable for applications in which the device is sold at a relatively sophisticated reseller or agent of the wireless provider, it is unavailable in many cases (including, for example, in the case of prepaid phones or phones that are purchased at locations other than dedicated resellers).

The third option is to sell a wireless device in an unactivated state and require the user to activate the phone before using it. Because, as noted above, the device is inoperable on the network until activation, the device itself cannot generally be used as the activation vehicle. Hence, the user will have to call the provider (using a different phone), visit the provider's website (using a separate computer or some other device), and/or the like. This option, while sometimes the only available option, is less than desirable because it imposes an inconvenience on the user, resulting in a competitive disadvantage for the provider in relation to techniques that do not impose this inconvenience on the user.

Moreover, existing techniques for activating wireless devices offer the user limited (if any) input into the phone number (e.g., MSISDN) that the device will be assigned.

So, it is clear that conventional techniques for activating telecommunications services typically require users to go through a multi-stage process. Even for a user who is evaluating a telecommunications service, the user is typically required to experience a multi-stage process and delays between stages before being able to evaluate a telecommunications service to decide whether to use the telecommunications service. For example, a user is typically asked, in one stage, to provide contact information (e.g., name, address, or other contact information). In another stage, a user is typically asked to provide billing information (e.g., a credit card number). After contact and billing information has been provided, if required, activating a telecommunications service is itself a multiple stage process.

Furthermore, conventional methods of provisioning and activation a telecommunication service typically involve communications over a telephone, over the internet (world wide web) on a computer, or over a fax machine with paper requests. This also causes inconvenience to the customers or potential customers in procuring telecommunications services on the go when hardware equipment such as a computer or fax machine, or services such as internet connections are not readily available.

So, mobile phone setup is time consuming and restrictive to consumers. Additionally, once a mobile phone and service plan have been setup for a consumer, the wireless network needs to be informed of the mobile phone and the mobile phone thereafter needs to register with the wireless network whenever being used. Registration requires a location update request be sent from the mobile phone to the wireless network. In the case of initial phone setup, since location update is triggered on power-up, typically the person configuring the mobile phone would be required to power-off and then power-on the mobile phone to render it active on the wireless network.

All of these identified issues are exacerbated by regulatory issues within the North American markets. In particular, because of numbering regulations in the US it is not currently possible to sell SIM (subscriber identity module) cards that are 'pre-activated' and can be simply inserted into a GSM based mobile phone device and start operating with a service without running through a manual activation process. So currently, although SIM cards can be sold apart from the mobile device, they must be activated by the hand of the consumer before usage. The issue that this creates is that the SIM Card (as sold) is useless unless the new customer contacts the carrier to activate his/her service. As described above, this is generally via dealer assisted activation, Internet/online activation, or by phone support activation. If the customer only has cash to pay, the options are reduced to 'dealer assisted' model only.

Standard wireless industry practices also hinder the ability to pre-activate a SIM card, since a pre-activated and unsold wireless product would not be able to be distinguished from a truly active device with a user therefore making financial reporting used for billing between vendors and license providers which are used to support the user very cumbersome.

What this means is that, effectively, the SIM Card cannot be sold and activated without depending on some other means of communication to the provider.

This inherently reduces the market to which mobile service can be sold and limiting the options for traditional cell phone distribution in respect to non-English speaking travelers to the US, anyone who does not have a credit card, immigrants, people who need emergency cell service but do not want to pay for a plan when they are not using it and many other population segments.

Dealer Network and Commissioning

The mobile services industry today works like many service and sales industries. A service provider signs up dealers to sell their service. The model is universal and, while it has many variations always comes down to a basic process:
1) An entity (retail shop, individual or distribution owner) signs up to sell the service.
2) The provider authorizes that entity to sell.
3) The entity sells service.
4) The carrier pays commissions to the entity based on confirmed sales or at point of activation.

While this model seems straightforward, it has drawbacks for providers. These include:
1) The dealers command increasing commissions, as there are more service providers in each dealer channel that are not growing (with limited shelf space).
2) Signing up and vetting dealers is time consuming and costly.
3) Not all dealers are trustworthy, so activation fraud is a constant threat.
4) Commissions must be calculated and paid. This is a considerable administrative burden as 'chargebacks', 'churn' and 'fraudulent activations' have to calculated and reduce commissions. It is cumbersome.

There is thus a need to avoid the various inconveniences and inefficiencies of conventional mobile phone setup. It is an object of the present invention to obviate or mitigate some or all of the above-noted disadvantages.

SUMMARY

The present invention provides, in one aspect, a method for activating an unlocked, inactive mobile device with a pre-provisioned Universal Integrated Circuit Card (UICC) including at least a service/price plan, said method comprising at least one of the following steps:

a) inserting a pre-provisioned UICC in said mobile device, wherein the UICC comprises an activation application activating said UICC by powering up the mobile device; detecting on the UICC the home network to which the UICC is registered, the activation application automatically directing the device to transmit at least one message to a provisioner, wherein said message requests automatic activation of the mobile device, the activation application receiving confirmation from the provisioner, said confirmation enabling activation of the mobile device, and the instant application of the pre-provisioned service and price plan to said device;

b) inserting a pre-provisioned UICC in said mobile device, wherein the UICC either does not comprise or require an activation application, activating said UICC by powering up the mobile device; detecting on the UICC the home network to which the UICC is registered, transmitting at least one message to a provisioner, wherein said message requests automatic activation of the mobile device, the device receiving confirmation from the provisioner, said confirmation enabling activation of the mobile device, and the instant application of the pre-provisioned service and price plan to said device;

c) inserting a pre-provisioned UICC in said mobile device wherein the UICC either does not comprise or require an activation application, activating the UICC by powering up the mobile device; detecting on the UICC the home network to which the UICC is registered, transmitting at least one message to a provisioner, transmitting at least one zip code message to a provisioner, wherein said message requests automatic activation of the mobile device, the device receiving confirmation from the provisioner, said confirmation enabling activation of the mobile device, provision of a phone number based on zip code transmitted, and the instant application of the pre-provisioned service and price plan to said device;

d) inserting a pre-provisioned UICC in said mobile device, wherein UICC card comprises an activation application, activating the UICC by powering up the mobile device; detecting on the UICC the home network to which the UICC is registered, the activation application automatically directing the device to transmit at least one message to a provisioner, transmitting at least one zip code message to the provisioner, wherein said message requests automatic activation of the mobile device, the activation application receiving confirmation from the provisioner, said confirmation enabling activation of the mobile device, provision of a phone number based on zip code transmitted and the instant application of the pre-provisioned service and price plan to said device;

e) selecting from a retailer a pre-provisioned UICC with an assigned a bar code/UPC and a service plan but which comprises a blocking flag preventing unauthorized activation of UICC, said UICC, upon scanning said bar code/UPC/QR code directs message to provisioner, receiving validation from provisioner of service plan as compared to bar code/UPC/QR code; removing blocking flag thereby creating a UICC unblocked and ready for self-activation in the mobile device by user;

f) inserting a pre-provisioned UICC in said mobile device, wherein the UICC either does not comprise or require an activation application, activating said UICC by powering up the mobile device and user contacting provisioner via interactive voice response (IVR) technology enabled by said UICC; detecting on the UICC the home network to which the UICC is registered and securing automatic activation of the mobile device and the instant application of the pre-provisioned service and price plan to said device;

g) inserting a pre-provisioned UICC in said mobile device, wherein the UICC either does not comprise or require an activation application, activating said UICC by powering up the mobile device, network detection software therein recognizing the UICC and detecting on the UICC the home network to which the UICC is registered and securing automatic activation of the mobile device and the instant application of the pre-provisioned service and price plan to said device;

h) inserting a pre-provisioned data use only UICC in said mobile device, wherein the UICC comprises an activation application activating said UICC by powering up the mobile device; detecting on the UICC the home network to which the UICC is registered, the activation application automatically directing activation of the data use only mobile device;

wherein, in any activation steps in a-g, if no zip code or an invalid zip code is provided, provisioner assigns a default zip code for phone number.

The present invention provides, in another aspect, a computer readable medium including at least computer program code for enabling an unlocked mobile device operable on a GSM (Global System for Mobiles) standard or a CDMA (Code Division Multiple Access) standard, said computer readable medium comprising computer program code for powering up the mobile device in response to insertion of a UICC within the mobile device; computer program code for receiving confirmation from a provisioner, said confirmation enabling activation of the mobile device, and the instant application of the pre-provisioned service and price plan to said device.

The present invention provides, in another aspect, one or more computer-readable media comprising computer-executable instructions for performing the following to achieve automated activation and provisioning for mobile device, which comprises: inserting a pre-provisioned UICC in said mobile device, wherein the UICC comprises an activation application activating said UICC by powering up the mobile device; detecting on the UICC the home network to which the UICC is registered, the activation application automatically directing the device to transmit at least one message to a provisioner, wherein said message requests automatic activation of the mobile device, the activation application receiving confirmation from the provisioner, said confirmation enabling activation of the mobile device, and the instant application of the pre-provisioned service and price plan to said device.

The present invention provides, in another aspect, one or more computer-readable media comprising computer-executable instructions for performing the following to achieve automated activation and provisioning for mobile device, which comprises inserting a pre-provisioned UICC in said mobile device, wherein the UICC either does not comprise or require an activation application, activating said UICC by powering up the mobile device; detecting on the UICC the home network to which the UICC is registered, transmitting at least one message to a provisioner, wherein said message requests automatic activation of the mobile device, the device receiving confirmation from the provisioner, said confirmation enabling activation of the mobile device, and the instant application of the pre-provisioned service and price plan to said device.

The present invention provides, in another aspect, one or more computer-readable media comprising computer-executable instructions for performing the following to achieve automated activation and provisioning for mobile device, which comprises inserting a pre-provisioned UICC in said mobile device wherein the UICC either does not comprise or require an activation application, activating the UICC by powering up the mobile device; detecting on the UICC the home network to which the UICC is registered, transmitting at least one message to a provisioner, transmitting at least one zip code message to a provisioner, wherein said message requests automatic activation of the mobile device, the device receiving confirmation from the provisioner, said confirmation enabling activation of the mobile device, provision of a phone number based on zip code transmitted, and the instant application of the pre-provisioned service and price plan to said device.

The present invention provides, in another aspect, one or more computer-readable media comprising computer-executable instructions for performing the following to achieve automated activation and provisioning for mobile device, which comprises inserting a pre-provisioned UICC in said mobile device, wherein UICC card comprises an activation application, activating the UICC by powering up the mobile device; detecting on the UICC the home network to which the UICC is registered, the activation application automatically directing the device to transmit at least one message to a provisioner, transmitting at least one zip code message to the provisioner, wherein said message requests automatic activation of the mobile device, the activation application receiving confirmation from the provisioner, said confirmation enabling activation of the mobile device, provision of a phone number based on zip code transmitted and the instant application of the pre-provisioned service and price plan to said device.

The present invention provides, in another aspect, one or more computer-readable media comprising computer-executable instructions for performing the following to achieve automated activation and provisioning for mobile device, which comprises selecting from a retailer a pre-provisioned UICC with an assigned a bar code/UPC and a service plan but which comprises a blocking flag preventing unauthorized activation of UICC, said UICC, upon scanning said bar code/UPC directs message to provisioner, receiving validation from provisioner of service plan as compared to bar code/UPC; removing blocking flag thereby creating a UICC unblocked and ready for self-activation in the mobile device by user.

The present invention provides, in another aspect, one or more computer-readable media comprising computer-executable instructions for performing the following to achieve automated activation and provisioning for mobile device, which comprises inserting a pre-provisioned UICC in said mobile device, wherein the UICC either does not comprise or require an activation application, activating said UICC by powering up the mobile device and user contacting provisioner via interactive voice response (IVR) technology enabled by said UICC; detecting on the UICC the home network to which the UICC is registered and securing automatic activation of the mobile device and the instant application of the pre-provisioned service and price plan to said device.

The present invention provides, in another aspect, one or more computer-readable media comprising computer-executable instructions for performing the following to achieve automated activation and provisioning for mobile device, which comprises inserting a pre-provisioned UICC in said mobile device, wherein the UICC either does not comprise or require an activation application, activating said UICC by powering up the mobile device, network detection software therein recognizing the UICC and detecting on the UICC the home network to which the UICC is registered and securing automatic activation of the mobile device and the instant application of the pre-provisioned service and price plan to said device.

The present invention provides, in another aspect, one or more computer-readable media comprising computer-executable instructions for performing the following to achieve automated activation and provisioning for mobile device, which comprises inserting a pre-provisioned data use only UICC in said mobile device, wherein the UICC comprises an activation application activating said UICC by powering up the mobile device; detecting on the UICC the home network to which the UICC is registered, the activation application automatically directing activation of the data use only mobile device.

The present invention provides, in another aspect, one or more computer-readable media comprising computer-executable instructions for performing the following to achieve automated activation and provisioning for mobile device, which comprises inserting a pre-provisioned Universal Integrated Circuit Card (UICC) in said mobile device, wherein said pre-provisioned UICC card includes at least a service/price plan and an activation application, powering up the mobile device; detecting on the UICC card the home network to which the card is registered, the UICC activation application automatically directing the device to transmit at least one short message service (SMS) message to a provisioner, wherein said message requests automatic activation of the mobile device, the UICC activation application receiving confirmation from the provisioner, said confirmation enabling activation of the mobile device, and the instant application of the pre-provisioned service and price plan to said device.

The present invention provides, in another aspect, a method for the delivery to a mobile phone user of a service plan and optionally a phone number without said user having to directly communicate with a mobile network operator and without said user having to provide any personal details to any third party or to the mobile network operator which comprises:
 a) packaging a voice and/or data service plan onto a UICC;
 b) conveying the UICC, so formed, directly or indirectly, to a mobile phone user; and
 c) activating service plan via a provisioner.

The present invention provides, in another aspect, a method for the delivery to a mobile phone user of a service plan and phone number without said user having to directly communicate with a mobile network operator and without said user having to provide any personal details to any third party or to the mobile network operator which comprises:
 packaging a service plan (and at least one of a phone number and data plan) from a mobile network operator;
 associating the plan and at least one of phone number and data plan with a non-provisioned Universal Integrated Circuit Card (UICC)
 cueing service plan loading and activation of the UICC post purchase of the UICC by a user in direct or indirect communication with a provisioner by at least one of 1) product code (for example UPC/bar code, QR code etc.) scanning of the UICC and messages generated thereby; 2) automatic messaging generated by an activation application on the UICC; 3) user directed short messaging; 4) interactive voice responses between user and a system of the provisioner; 5) network detection software; 6) user interaction with a website; and 7) user entry of a zip code.

The present invention provides, in another aspect a UICC comprising a packaged service plan (and at least one of a phone number and data plan) from a mobile network operator and wherein service plan is loaded and activated by a user in direct or indirect communication with a provisioner by at least one of 1) UPC (for example bar code, QR code etc.) scanning of the UICC and messages generated thereby; 2) automatic messaging generated by an activation application on the UICC; 3) user directed short messaging; 4) interactive voice responses between user and a system of the provisioner; 5) network detection software; 6) user interaction with a website; and 7) user entry of a zip code The present invention provides, in another aspect, an unlocked mobile device loaded with a UICC, said UICC comprising a packaged service plan (and at least one of a phone number and data plan) from a mobile network operator and wherein service plan is loaded and activated by a user in direct or indirect communication with a provisioner by at least one of 1) UPC (for example bar code, QR code etc.) scanning of the UICC and messages generated thereby; 2) automatic messaging generated by an activation application on the UICC; 3) user directed short messaging; 4) interactive voice responses between user and a system of the provisioner; 5) network detection software; 6) user interaction with a website; and 7) user entry of a zip code.

The present invention provides, in a further aspect, a system for activating an unlocked, inactive mobile device with a pre-provisioned Universal Integrated Circuit Card (UICC) including at least a service/price plan comprises a server and one or more databases, wherein the server executes at least one of the methods described herein.

The system, device and method of the present invention creates new way to deliver mobile phone activation and services. What this invention achieves is the purchase and activation of UICC (for example, a SIM card) within a mobile device without a user taking any steps other than 1) the purchase of the UICC 2) the insertion of the UICC in the unlocked mobile device and 3) the powering up of the device and wherein there is no requirement for direct contact between the user and the mobile network operator, without the user providing any user personal details to the mobile network operator, and without having the user (by name, address, credit card number etc. . . . ) being connected to any phone number. Furthermore and critically, the UICC comprises a service plan. This has not been previously achieved.

The features of the present invention inherently open the market on mobile phone activations and pre-paid services attached to UICCs. This increases the options and possibilities for traditional cell phone distribution in respect to non-English speaking travelers to the US, anyone who does not have a credit card, immigrants, people who need emergency cell service but do not want to pay for a plan when they are not using it and many other population segments.

In further aspects of the invention, there is provided a provisioned or non-provisioned UICC and methods of post-purchase, automatic activation of a service plan/phone number on a mobile device with which the UICC is to be associated. This aspect of the present invention allows sale of a UICC which is merely "a piece of plastic", and analogous to a non-loaded gift card in a store. For retailers, this is a breakthrough method of providing mobile phone services.

In further aspects of the invention, there is provided a data plan only UICC and methods of post-purchase, automatic activation of a data service plan on a mobile device with which the UICC is to be associated.

These and other advantages of the invention will become apparent throughout the present disclosure.

BRIEF DESCRIPTION OF THE FIGURES

FIG. 4 is illustrates the SIM load process that enables flexibility in assigning price plans to the UICCs such that inventory can be kept at minimum and new price plans can be added and on the shelves in a matter of days

DETAILED DESCRIPTION

Figure 1:
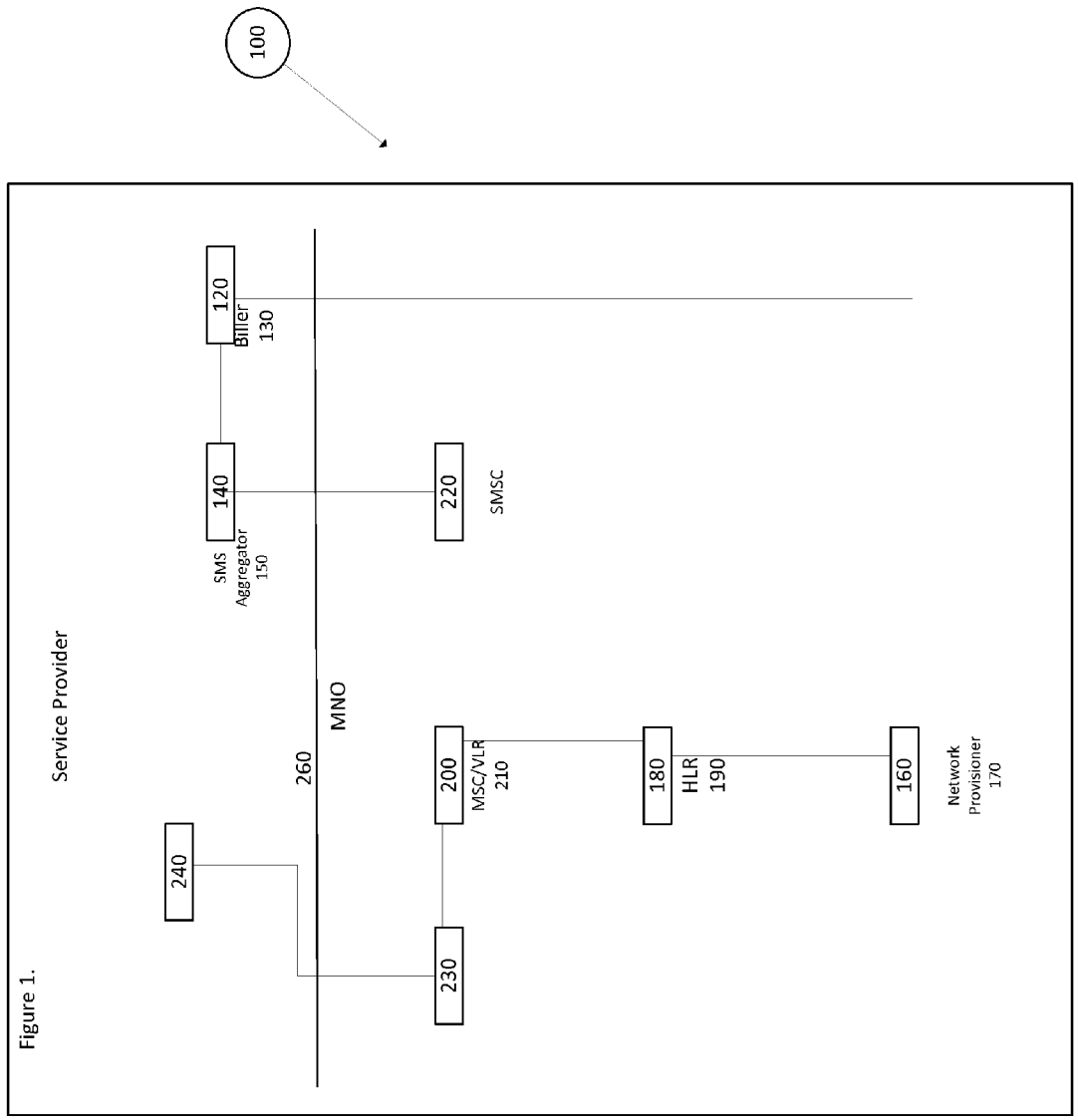
FIG. 1 illustrates a schematic diagram of a wireless device provisioning system and the supporting telecom network in accordance with one or more embodiments of the present invention. This figure is provided for context only.

There is provided herein a method, system and apparatus for the efficient, automated activation of mobile device services using a UICC. A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

Any algorithms and displays with the applications described herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

An embodiment of the invention may be implemented as a method or as a machine readable non-transitory storage medium that stores executable instructions that, when executed by a data processing system, causes the system to perform a method. An apparatus, such as a data processing system, can also be an embodiment of the invention. Other features of the present invention will be apparent from the accompanying drawings and from the detailed description which follows.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "device" and "mobile device" refer herein to any personal digital assistants, Smart phones, other cell phones, tablets and the like.

The term "variation" of an invention means an embodiment of the invention, unless expressly specified otherwise. A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in a sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

The term "message" or "short message" as used herein refers to an access point of connection via which the UICC communicates and includes text messaging/SMS, IVR, voice connection, MMS and data connection.

The term SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G and 4G networks. However, not all text messaging systems use SMS, and some notable alternative implementations of the concept include J-Phone's Sky-Mail and NTT Docomo's Short Mail, both in Japan. Email messaging from phones, as popularized by NTT Docomo's i-mode and the BlackBerry smartphone, also typically use standard mail protocols such as SMTP over TCP/IP. Within the scope of the present invention, SMS and text messaging is to be accorded a wide breadth.

Multimedia Messaging Service (MMS) is a standard way to send messages that include multimedia content to and from mobile phones. It extends the core SMS (Short Message Service) capability that allowed exchange of text messages only up to 160 characters in length. While the most popular use is to send photographs from camera-equipped handsets, it is also used as a method of delivering news and entertainment content including videos, pictures, text pages and ringtones. MMS can be used within the context of the present invention for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

Once the MMSC has received a message, it first determines whether the receiver's handset is "MMS capable", that it supports the standards for receiving MMS. If so, the content is extracted and sent to a temporary storage server with an HTTP front-end. An SMS "control message" containing the URL of the content is then sent to the recipient's handset to trigger the receiver's WAP browser to open and receive the content from the embedded URL. Several other messages are exchanged to indicate status of the delivery attempt. Before delivering content, some MMSCs also include a conversion service that will attempt to modify the multimedia content into a format suitable for the receiver. This is known as "content adaptation". If the receiver's handset is not MMS capable, the message is usually delivered to a web based service from where the content can be viewed from a normal internet browser. The URL for the content is usually sent to the receiver's phone in a normal text message. This behaviour is usually known as the "legacy experience" since content can still be received by a phone number, even if the phone itself does not support MMS.

As used herein interactive voice response (IVR) is a technology that allows a computer to interact with humans through the use of voice and DTMF tones input via keypad. In telecommunications, IVR allows customers to interact with a company's host system via a telephone keypad or by speech recognition, after which they can service their own inquiries by following the IVR dialogue. IVR systems can respond with prerecorded or dynamically generated audio to further direct users on how to proceed. IVR applications can be used to control almost any function where the interface can be broken down into a series of simple interactions. IVR systems deployed in the network are sized to handle large call volumes. IVR can be used within the context of the present invention for UICC activation message delivery The abbreviation "MNO" refers to mobile network operator. The abbreviation "HLR" refers to home location registry. The abbreviation "MMSC" refers to multi-media switching centre. The abbreviation "SMSC" refers to short message switching centre. The abbreviation "MSISDN" refers to mobile subscriber integrated services digital network number.

The term Universal Product Code (UPC) is a barcode symbology (i.e., a specific type of barcode) that is widely used in the United States, Canada, the United Kingdom, Australia, New Zealand and in other countries for tracking trade items in stores. Its most common form, the UPC-A, consists of 12 numerical digits, which are uniquely assigned to each trade item. As used herein, the product code which is scanned for use in point of sale validation and removal of blocking flags from UICC may be any product identifier code such as UPC/bar codes and QR codes. As used herein, a Quick Response (QR) code is a type of scannable barcode consisting of square dots arranged in a square pattern on a white background, used to convey information pertaining to a product, here a UICC.

Figure 2:
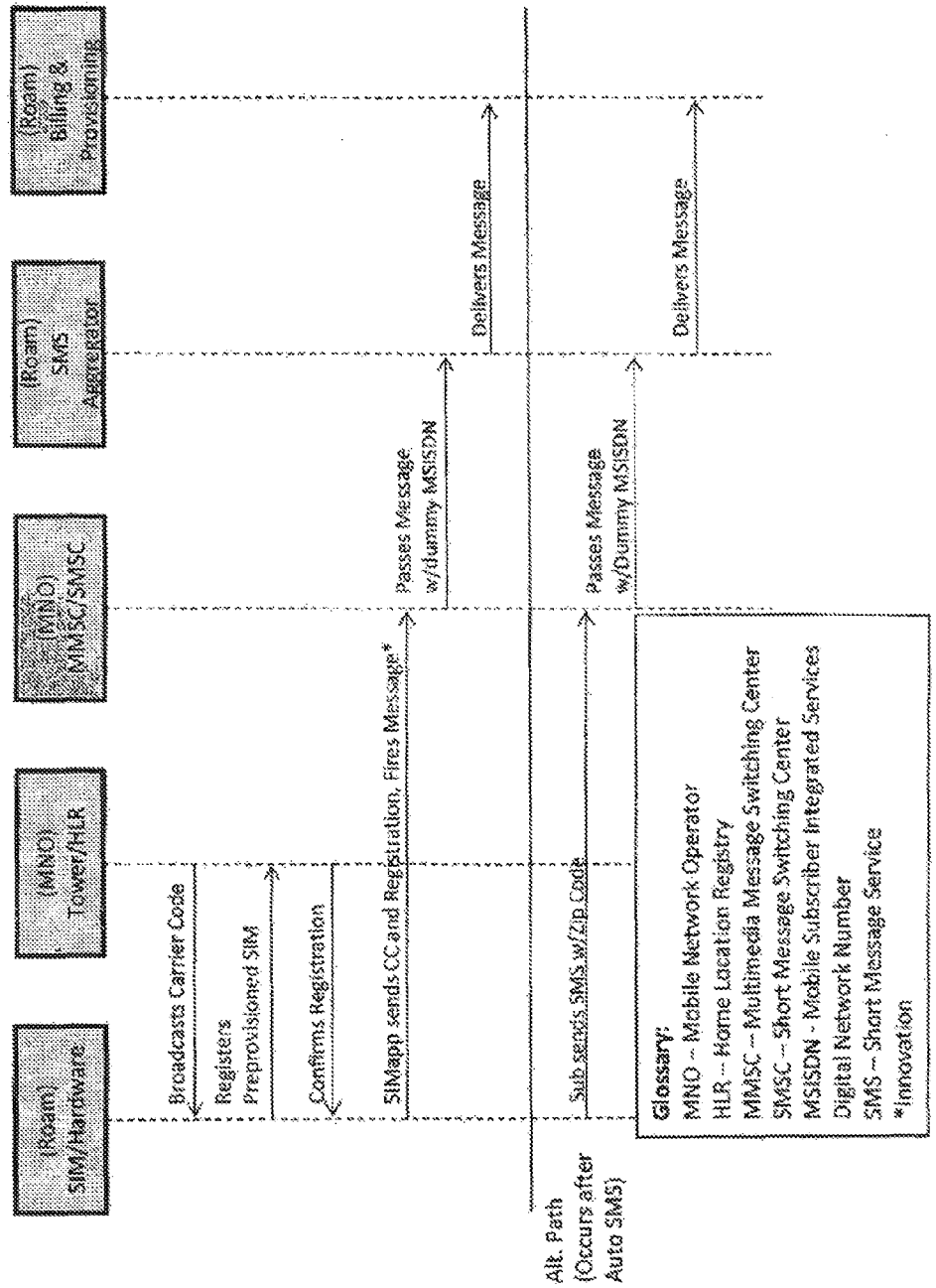
FIG. 2 illustrates an operation flow diagram of the automated message sequence whereby the UICC detects the appropriate network signal and uses that signal as a trigger to send the activation message. Additionally, an alternative manual flow is depicted where a subscriber actively sends a message to ensure the activation takes place. Both flows are supported within the context of this invention.
Figure 3:
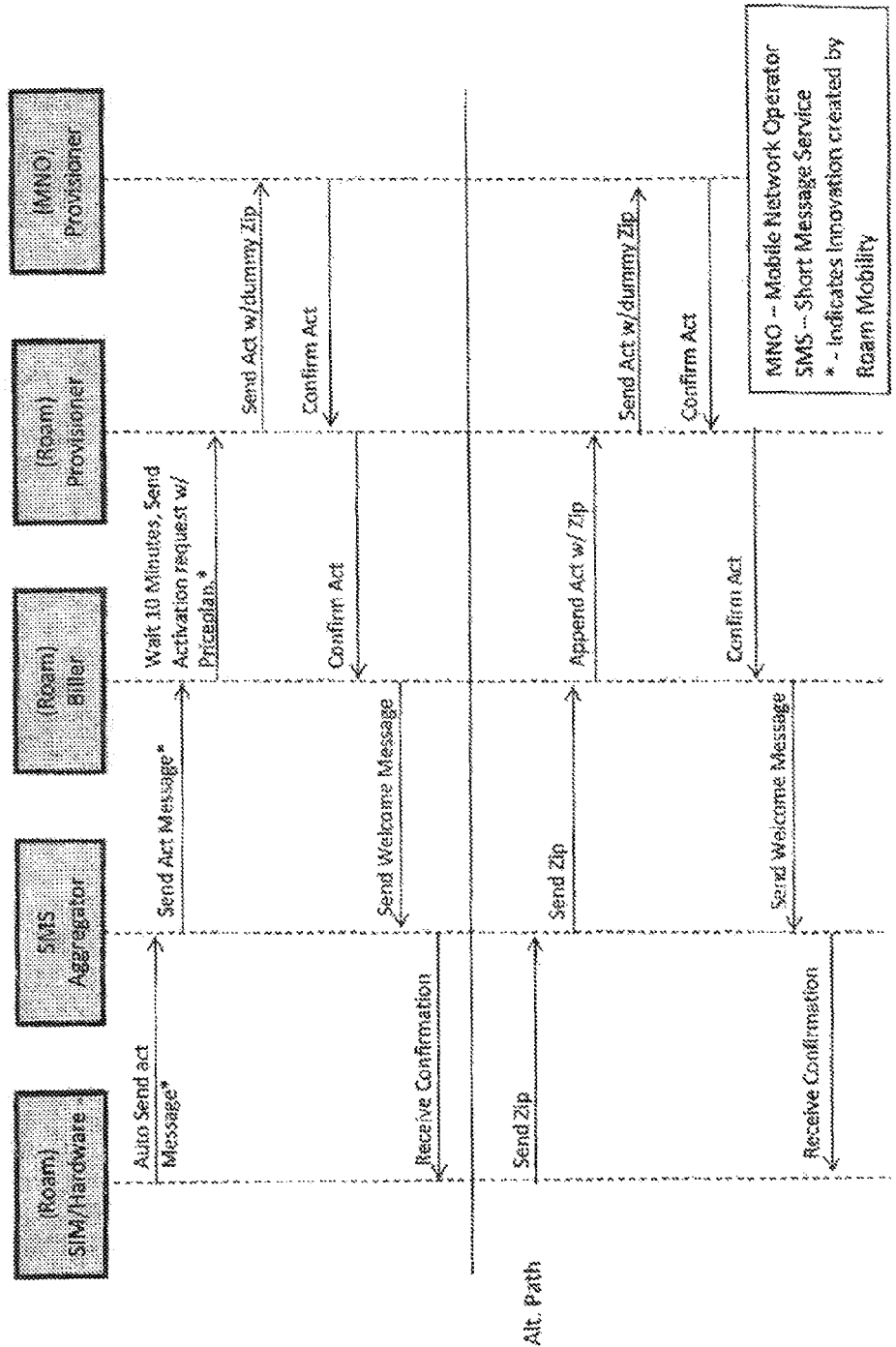
FIG. 3 illustrates an operation flow diagram of the automated activation sequence whereby the automated activation message is received and the appropriate msisdn is assigned with the appropriate price plan (features); Additionally this figure depicts an alternative flow that is automatically initiated in the event that an invalid message is received for activation, thereby eliminating failed activations.

The term "provisioner" within the scope of the invention need not be a mobile network operator, as is apparent in FIGS. 2 and 3.

The term "service plan" includes voice calling plan with phone number, data plan with or without phone number or any combination thereof. Service plan may comprise price, duration and geographic restrictions.

The term "UICC" is an abbreviation for Universal Integrated Circuit Card, which is the universal smart card used in mobile terminals in GSM and UMTS networks. In a GSM network, the UICC contains a SIM application and in a UMTS network it is the USIM application. A UICC may contain several applications, making it possible for the same smart card to give access to both GSM and UMTS networks, and also provide storage of a phone book and other applications. It is also possible to access a GSM network using a USIM application and it is possible to access UMTS networks using a SIM application with mobile terminals prepared for this The term "GSM" is an abbreviation for Global System for Mobile Communications, (originally Groupe Special Mobile) and is a standard set developed by the European Telecommunications Standards Institute (ETSI) to describe protocols for second generation (2G) digital cellular networks used by mobile phones. Within the scope of the differing aspects of the present invention, both pre-provisioned and non-provisioned UICCs are provided. Pre-provisioned UICCs include at least a service/price plan and an activation application. Non-provisioned UICC may include neither a service/price plan nor an activation application. Non-provisioned UICC may include only an activation application but no specific service/price plan.

The term "SIM" is an abbreviation for Subscriber Identity Module or Subscriber Identification Module and is an integrated circuit that conventionally securely stores the International Mobile Subscriber Identity (IMSI) and the related key used to identify and authenticate subscribers on mobile telephony devices (such as mobile phones and computers). A SIM is embedded into a removable SIM card, which can be transferred between different mobile devices.

By way of background, GSM and Code Division Multiple Access (CDMA) are two competing standards in cellular service. They both have derivatives for use with 3 Gphones known as Universal Mobile Telecommunications System (UMTS) and CDMA2000, respectively. The major difference between the two technologies is how they turn voice data into radio waves and how the carrier connects to the phone. Other differences include the coverage area, the data transfer speeds, and the type of hardware used. The methods, devices and systems of the invention are equally applicable to both standards.

Coverage

Some areas and countries only have one technology available. Generally speaking, CDMA is most commonly found in North America and some parts of Asia, while GSM is found in most other places. Some carriers do offer international or "world" phones. While CDMA and GSM compete head on in terms of higher bandwidth speed (i.e. for surfing the mobile Web), GSM has more complete global coverage due to roaming and international roaming contracts. GSM technology tends to cover rural areas in the U.S. more completely than CDMA Five of the top seven carriers in the US use CDMA: Verizon Wireless, Sprint, MetroPCS, Cricket, and U.S. Cellular. AT&T and T-Mobile use GSM. The rest of the world is largely GSM. The global spread of GSM came about because in 1987, Europe mandated the technology by law, and because GSM arose from an industry consortium.

GSM phones and CDMA phones also use different types of UICC. UICCs can be programmed to work with either GSM or CDMA and their derivatives, or with both. Those that only work with GSM phones are called SIM Cards and those that only work with CDMA phones are called CDMA2000 Subscriber Identity Module (CSIM) cards. There are also a few types of UICCs that are programmed to work with GSM, UMTS, CDMA, and CDMA2000, including CSIM/USIM cards and Removable User Identity Module (R-UIM) cards.

CDMA uses a "spread-spectrum" technique whereby electromagnetic energy is spread to allow for a signal with a wider bandwidth. This allows multiple people on multiple cell phones to be "multiplexed" over the same channel to share a bandwidth of frequencies. With CDMA technology, data and voice packets are separated using codes and then transmitted using a wide frequency range. Since more space is often allocated for data with CDMA, this standard became attractive for 3G high-speed mobile Internet use.

Due to a number of regulations in North America (including in Canada and the US), it is not currently possible to sell SIM Cards that are 'pre-activated' and can be simply inserted into an unlocked (for example GSM based) device and start operating with service without the conventional steps of running through a manual activation process.

As such, the UICC (for example, SIM Card) while already loaded with a service/price plan, must be sold and then activated. The issue that this creates is that the UICC is useless without the new customer having a way to contact the mobile carrier to activate his service. To do this, as noted above, the options today are: dealer assisted activation, Internet/online activation, or activation by phone support. If the customer only has cash to pay the options are reduced to 'dealer assisted' model only i.e. walking into a store or vendor. In any event, the user/customer is actively involved in the activation and must provide personal details to secure such activation and to "link" him/herself to that device.

These problems are fully solved within the scope of the present invention which provides a number of aspects and embodiments. In considering each embodiment, it is important to understand that it is not necessarily required that there is an activation application on the UICC. What is required is a means to "trigger" activation of the UICC. The activation application is only one such "enabler" to triggering activation of the UICC. It is specifically needed in situations where a mobile network operator or carrier will not permit the sending of a short message (for example an SMS) from a device in a pre-provisioned state. In such cases, an activation application on the UICC overcomes this problem. However, where a MNO or carrier makes adjustments to functionality to enable sending of a message from a device in a pre-provisioned state, there is, strictly speaking, no need for the activation application. Activation is enabled by one or more other triggers, as described herein.

Essentially, an activation application is not required any time the customer can send a zip code or any message to the short code. The activation application on the UICC is required in the event that a purchaser/customer does not or cannot send any other type of message (ZIP Code, text messaging/SMS, IVR, voice connection, MMS and data).

It is preferred to use UICC activation application to trigger activation of "data only" (no phone number) UICCs or SIMs. In other words, data SIMs (SIMs that only provide mobile data services) do not require a local number. These activations can be done solely with the SIM Application and the customer is not required to send in a text message to activate the SIM Card.

The present invention provides methods of activating an unlocked, inactive mobile device with a pre-provisioned UICC including at least a service/price plan, said method comprising the following steps: inserting a pre-provisioned UICC in said mobile device, wherein the UICC comprises an activation application activating said UICC by powering up the mobile device; detecting on the UICC the home network to which the UICC is registered, the activation application automatically directing the device to transmit at least one message to a provisioner, wherein said message requests automatic activation of the mobile device, the activation application receiving confirmation from the provisioner, said confirmation enabling activation of the mobile device, and the instant application of the pre-provisioned service and price plan to said device.

The present invention provides methods of activating an unlocked, inactive mobile device with a pre-provisioned UICC including at least a service/price plan, said method comprising the following steps:inserting a pre-provisioned UICC in said mobile device, wherein the UICC either does not comprise or require an activation application, activating said UICC by powering up the mobile device; detecting on the UICC the home network to which the UICC is registered, transmitting at least one message to a provisioner, wherein said message requests automatic activation of the mobile device, the device receiving confirmation from the provisioner, said confirmation enabling activation of the mobile device, and the instant application of the pre-provisioned service and price plan to said device.

The present invention provides methods of activating an unlocked, inactive mobile device with a pre-provisioned UICC including at least a service/price plan, said method comprising the following steps: inserting a pre-provisioned UICC in said mobile device wherein the UICC either does not comprise or require an activation application, activating the UICC by powering up the mobile device; detecting on the UICC the home network to which the UICC is registered, transmitting at least one message to a provisioner, transmitting at least one zip code message to a provisioner, wherein said message requests automatic activation of the mobile device, the device receiving confirmation from the provisioner, said confirmation enabling activation of the mobile device, provision of a phone number based on zip code transmitted, and the instant application of the pre-provisioned service and price plan to said device.

The present invention provides methods of activating an unlocked, inactive mobile device with a pre-provisioned UICC including at least a service/price plan, said method comprising the following steps: inserting a pre-provisioned UICC in said mobile device, wherein UICC card comprises an activation application, activating the UICC by powering up the mobile device; detecting on the UICC the home network to which the UICC is registered, the activation application automatically directing the device to transmit at least one message to a provisioner, transmitting at least one zip code message to the provisioner, wherein said message requests automatic activation of the mobile device, the activation application receiving confirmation from the provisioner, said confirmation enabling activation of the mobile device, provision of a phone number based on zip code transmitted and the instant application of the pre-provisioned service and price plan to said device.

The present invention provides methods of activating an unlocked, inactive mobile device with a pre-provisioned UICC including at least a service/price plan, said method comprising the following steps: selecting from a retailer a pre-provisioned UICC with an assigned a bar code/UPC and a service plan but which comprises a blocking flag preventing unauthorized activation of UICC, said UICC, upon scanning said bar code/UPC/QR code directs message to provisioner, receiving validation from provisioner of service plan as compared to bar code/UPC/QR code; removing blocking flag thereby creating a UICC unblocked and ready for self-activation in the mobile device by user.

The present invention provides methods of activating an unlocked, inactive mobile device with a pre-provisioned UICC including at least a service/price plan, said method comprising the following steps: inserting a pre-provisioned UICC in said mobile device, wherein the UICC either does not comprise or require an activation application, activating said UICC by powering up the mobile device and user contacting provisioner via interactive voice response (IVR) technology enabled by said UICC; detecting on the UICC the home network to which the UICC is registered and securing automatic activation of the mobile device and the instant application of the pre-provisioned service and price plan to said device.

The present invention provides methods of activating an unlocked, inactive mobile device with a pre-provisioned UICC including at least a service/price plan, said method comprising the following steps: inserting a pre-provisioned UICC in said mobile device, wherein the UICC either does not comprise or require an activation application, activating said UICC by powering up the mobile device, network detection software therein recognizing the UICC and detecting on the UICC the home network to which the UICC is registered and securing automatic activation of the mobile device and the instant application of the pre-provisioned service and price plan to said device.

The present invention provides methods of activating an unlocked, inactive mobile device with a pre-provisioned UICC including at least a service/price plan, said method comprising the following steps: inserting a pre-provisioned data use only UICC in said mobile device, wherein the UICC comprises an activation application activating said UICC by powering up the mobile device; detecting on the UICC the home network to which the UICC is registered, the activation application automatically directing activation of the data use only mobile device.

Preferably, in any activation steps if no zip code or an invalid zip code is provided by a user/purchaser, the provisioner may assign a default zip code for linking to an area code for said phone number.

In operation:

UICC with Activation Application/Zip Code Entry or Non-entry

A purchaser/user inserts pre-provisioned UICC into unlocked mobile device and powers up device. Activation application triggers a message request for purchaser to message location code (for example zip code or postal code) to provisioner. If purchaser transmits a message with location code to provisioner (preferably via message aggregator), provisioner looks up UICC number and activates UICC with pre-assigned service plan (for example price plan, phone number and/or data plan) and transmits message to purchaser with phone number and/or data plan, confirmation of activation and expiry of plan. If transmitted location code is invalid or if no location code is transmitted, provisioner assigns default location code and activates UICC with pre-assigned service plan and transmits message to purchaser with phone number and/or data plan, confirmation of activation and expiry of plan. Messages may be text messages/SMS, IVR, via voice connection, MMS and via data.

UICC with No Activation Application

A purchaser/user inserts pre-provisioned UICC into unlocked mobile device and powers up device. Purchaser/user is enabled to trigger the activation of the UICC within the device without an activation application. In one aspect, mobile network operator has enabled device with UICC to transmit a message to a provisioner or message aggregator in a pre-provisioned state. In such a case, an activation application on the UICC is not required. In another aspect, a purchaser/user is enabled to trigger the activation of the UICC within the device by transmitting a message to a provisoner or message aggregator comprising a zip code or postal code or other location code. In such a case, an activation application on the UICC is not required. In yet another aspect, a purchaser/user is enables "ready the UICC for triggering activation of the UICC" by the act of purchasing the UICC i.e. by retail product code/bar code/UPC/QR code scanning of the UICC. Such scanning, via a backend point of sale (POS) system, messages or otherwise notifies provisioner or message aggregator which is turn validates the plan and UICC number (against plans and UICC numbers in a database) and thereafter removes a blocking flag from the UICC ("unblocked and unactivated UICC"). Such an unblocked and unactivated UICC is in a state ready to be self-activated by user/purchaser at any time within a noted and prescribed time frame. In yet another aspect, a purchaser/user is enabled to trigger the activation of a "data plan only" UICC within the device by transmitting a message to a provisoner or message aggregator.

Blocking flags are a preferred feature of POS UICCs. They are any means, including locks (physical or electronic) which prevent the UICC from being activated if not scanned and paid for.

UICC with No Activation Application-Point of Sale Activation-Retailer Buys Only UICC (Provisioner collects remuneration for Assigned Service/Price Plan)

A purchaser/user selects a pre-provisioned with a service plan but "blocked" UICC (having an ID number) and said UICC is product code scanned. This scanning may be achieved at a POS terminal, desk, kiosk or via a purchaser's or retailer's mobile computing device (for example, a SmartPhone or tablet). Product code triggers POS system to transmit a message to provisioner and/or message aggregator, preferably over an activation server. Provisioner database, within its computing system, validates the UICC number and the service plan. If validated, provisioner enables the removal of the blocking flag from the UICC. Purchaser pays and UICC is not, strictly speaking, "active" but it is in a state ready for self-activation by purchaser within a pre-set time frame (preferably from 1-3 years, more preferably 2 years).

UICC with No Activation Application—Point of Sale Activation-Retailer Buys UICC and Service/Price Plans from Provisioner A purchaser/user selects a "blocked" pre-provisioned with a service plan UICC (having an ID number) and said UICC is product code scanned. This scanning may be achieved at a POS terminal, desk, kiosk or via a purchaser's or retailer's mobile computing device (for example, a SmartPhone or tablet). Product code triggers POS system to transmit a message to provisioner and/or message aggregator, preferably over an activation server. Provisioner database, within its computing system, validates the UICC number and the service plan. If validated, provisioner enables the removal of the blocking flag from the UICC. Purchaser pays and UICC is not, strictly speaking, "active" but it is in a state ready for self-activation by purchaser within a pre-set time frame (preferably from 1-3 years, more preferably 2 years).

There are at least two options for sale at the retailer level for the Point of Sale Activation (POSA) of the UICC. The purchaser experience will be the same regardless of which retail option is being offered for sale. In one option, a retailer purchases only the UICC hardware from a supplier, preferably the provisioner. In this case, for every UICC that is unblocked, the retailer pays to the provisioner the full value of service plan (minus the UICC price and commission). There is a higher financial upside for the provisioner, which takes more risk for any improper activation and use of UICC. In another option, the retailer purchases the UICC hardware with service plan from a supplier, preferably the provisioner (in most cases, this amounts to all up-front payments). In this case, for every UICC that is unblocked, retailer takes more risk for any improper activation and use of UICC but can premium bill for the service plans.

Carrier and Provisioner Related Notes

In implementing the method and system of the invention, it is important to note that a carrier (MNO) cannot differentiate between a message generated by the UICC (for example, a SIM card) activation application and one generated by an actual physical customer, generating a message. Furthermore, there is no difference at the carrier level between an activation wherein UICC activation application is required and used and one where such an application is not used or required. The ONLY requirement of the carrier (MNO) is that it allows/enables the UICC to communicate with at least one access point connection (for example, SMS, Voice, MMS or Data) before the activation of the UICC. All other functionality and differentiation is handled within the scope of the invention by the MVNO (referred to by way of example herein as Roam Mobility Inc, a company providing such services).

In one further aspect, the present invention provides, in one aspect, a method for activating an unlocked, inactive mobile device operable on a GSM (Global System for Mobiles) standard, said method comprising: inserting a pre-provisioned Universal Integrated Circuit Card (UICC) in said mobile device, wherein said pre-provisioned UICC card includes at least a service/price plan and an activation application, powering up the mobile device; detecting on the UICC card the home network to which the card is registered, the UICC activation application automatically directing the device to transmit at least one short message service (SMS) message to a provisioner, wherein said message requests automatic activation of the mobile device, the UICC activation application receiving confirmation from the provisioner, said confirmation enabling activation of the mobile device, and the instant application of the pre-provisioned service and price plan to said device.

The present invention provides, in another aspect, a method for activating an unlocked, inactive mobile device operable on a CDMA (Code Division Multiple Access) standard, said method comprising: inserting a pre-provisioned Universal Integrated Circuit Card (UICC) in said mobile device, wherein said pre-provisioned UICC card includes at least a service/price plan, powering up the mobile device; detecting on the UICC card the home network to which the card is registered, the UICC card insertion and powering up triggering an activation application within the device to automatically direct the device to transmit at least one short message service (SMS) message to a provisioner, wherein said message requests automatic activation of the mobile device, the device activation application receiving confirmation from the provisioner, said confirmation enabling activation of the mobile device, and the instant application of the UICC card pre-provisioned service and price plan to said device.

The present invention provides, in one aspect, a method for activating an unlocked, inactive mobile device operable on a GSM (Global System for Mobiles) standard, said method comprising: acquiring a non-provisioned Universal Integrated Circuit Card (UICC), said UICC being capable of automatic activation for a chosen service/price plan; provisioning the UICC with the service/price plan by way of scanning a UPC code associated with the UICC, which scanning causes the delivery of a message to a service provisioner, wherein said message cues automatic activation of a mobile device into which UICC is inserted.

The present invention provides, in one aspect, a method for activating an unlocked, inactive mobile device operable on a GSM (Global System for Mobiles) standard, said method comprising: acquiring a non-provisioned Universal Integrated Circuit Card (UICC), said UICC being capable of automatic activation for a chosen service/price plan and a UICC activation application; provisioning the UICC with the service/price plan by way of scanning a UPC code associated with the UICC, which scanning causes the delivery of a message to a service provisioner, wherein said message cues automatic activation of a mobile device into which UICC is inserted and wherein UICC activation application receives confirmation from the provisioner, said confirmation enabling activation of the mobile device and the instant application of the service/price plan to said device.

The present invention provides, in one aspect, a method for activating an unlocked, inactive mobile device operable on a GSM (Global System for Mobiles) standard, said method comprising: acquiring a non-provisioned Universal Integrated Circuit Card (UICC), said UICC being capable of automatic activation for a chosen service/price plan; provisioning the UICC with the service/price plan by way of delivery of at least one short message service (SMS) to a provisioner, which SMS causes the delivery of a message to a service provisioner, wherein said message cues automatic activation of a mobile device into which UICC is inserted.

The present invention provides, in one aspect, a method for activating an unlocked, inactive mobile device operable on a GSM (Global System for Mobiles) standard, said method comprising: acquiring a non-provisioned Universal Integrated Circuit Card (UICC), said UICC being capable of automatic activation for a chosen service/price plan and a UICC activation application; provisioning the UICC with the service/price plan by way of delivery of at least one short message service (SMS) to a provisioner, which SMS causes the delivery of a message to a service provisioner, wherein said message cues automatic activation of a mobile device into which UICC is inserted and wherein UICC activation application receives confirmation from the provisioner, said confirmation enabling activation of the mobile device and the instant application of the service/price plan to said device.

The present invention provides, in another aspect, a computer readable medium including at least computer program code for enabling an unlocked mobile device operable on a GSM (Global System for Mobiles) standard or a CDMA (Code Division Multiple Access) standard, said computer readable medium comprising computer program code for powering up the mobile device in response to insertion of a UICC within the mobile device; computer program code for receiving confirmation from a provisioner, said confirmation enabling activation of the mobile device, and the instant application of the pre-provisioned service and price plan to said device.

The present invention provides, in another aspect, one or more computer-readable media comprising computer-executable instructions for performing the following to achieve automated activation and provisioning for mobile device, which comprises: inserting a pre-provisioned Universal Integrated Circuit Card (UICC) in said mobile device, wherein said pre-provisioned UICC card includes at least a service/price plan and an activation application, powering up the mobile device; detecting on the UICC card the home network to which the card is registered, the UICC activation application automatically directing the device to transmit at least one short message service (SMS) message to a provisioner, wherein said message requests automatic activation of the mobile device, the UICC activation application receiving confirmation from the provisioner, said confirmation enabling activation of the mobile device, and the instant application of the pre-provisioned service and price plan to said device.

The present invention provides, in another aspect, one or more computer-readable media comprising computer-executable instructions for performing the following to achieve automated activation and provisioning an unlocked, inactive for mobile device, operable on a GSM (Global System for Mobiles) standard, which comprises: acquiring a non-provisioned Universal Integrated Circuit Card (UICC), said UICC being capable of automatic activation for a chosen service/price plan; provisioning the UICC with the service/price plan by way of scanning a UPC code associated with the UICC, which scanning causes the delivery of a message to a service provisioner, wherein said message cues automatic activation of a mobile device into which UICC is inserted.

The present invention provides, in another aspect, one or more computer-readable media comprising computer-executable instructions for performing the following to achieve automated activation and provisioning an unlocked, inactive for mobile device, operable on a GSM (Global System for Mobiles) standard, which comprises: acquiring a non-provisioned Universal Integrated Circuit Card (UICC), said UICC being capable of automatic activation for a chosen service/price plan and activation application; provisioning the UICC with the service/price plan by way of scanning a UPC code associated with the UICC, which scanning causes the delivery of a message to a service provisioner, wherein said message cues automatic activation of a mobile device into which UICC is inserted wherein said message requests automatic activation of the mobile device, the UICC activation application receiving confirmation from the provisioner, said confirmation enabling activation of the mobile device, and the instant application of the pre-provisioned service and price plan to said device.

The present invention provides, in another aspect, one or more computer-readable media comprising computer-executable instructions for performing the following to achieve automated activation and provisioning an unlocked, inactive for mobile device, operable on a GSM (Global System for Mobiles) standard, which comprises: provisioning the UICC with the service/price plan by way of delivery of at least one short message service (SMS) to a provisioner, which SMS causes the delivery of a message to a service provisioner, wherein said message cues automatic activation of a mobile device into which UICC is inserted.

The present invention provides, in another aspect, one or more computer-readable media comprising computer-executable instructions for performing the following to achieve automated activation and provisioning an unlocked, inactive for mobile device, operable on a GSM (Global System for Mobiles) standard, which comprises: acquiring a non-provisioned Universal Integrated Circuit Card (UICC), said UICC being capable of automatic activation for a chosen service/price plan and a UICC activation application; provisioning the UICC with the service/price plan by way of delivery of at least one short message service (SMS) to a provisioner, which SMS causes the delivery of a message to a service provisioner, wherein said message cues automatic activation of a mobile device into which UICC is inserted and wherein UICC activation application receives confirmation from the provisioner, said confirmation enabling activation of the mobile device and the instant application of the service/price plan to said device.

The present invention provides, in another aspect, one or more computer-readable media comprising computer-executable instructions for performing the following to achieve automated activation and provisioning for mobile device, which device is operable on a CDMA (Code Division Multiple Access) standard: inserting a pre-provisioned Universal Integrated Circuit Card (UICC) in said mobile device, wherein said pre-provisioned UICC card includes at least a service/price plan, powering up the mobile device; detecting on the UICC card the home network to which the card is registered, the UICC card insertion and powering up triggering an activation application within the device to automatically direct the device to transmit at least one short message service (SMS) message to a provisioner, wherein said message requests automatic activation of the mobile device, the device activation application receiving confirmation from the provisioner, said confirmation enabling activation of the mobile device, and the instant application of the UICC card pre-provisioned service and price plan to said device.

The present invention provides, in another aspect, a method for the delivery to a mobile phone user of a service plan and phone number without said user having to directly communicate with a mobile network operator and without said user having to provide any personal details to any third party or to the mobile network operator which comprises:
  packaging a service plan from a mobile network operator and loading the service plan onto a Universal Integrated Circuit Card (UICC)
  either a) loading an activation application onto the UICC and/or device or b) enabling a triggering means to activate the service plan;
  conveying the UICC, so formed, directly or indirectly, to a mobile phone user;

receiving a message confirming that user has inserted UICC into mobile phone; and confirming activation of service plan and (optionally) a phone number.

Wherein a sale of a UICC at retailer, it is an option to enable retailer to lock the functionality of the UICC until the retailer unlocks it via electronic confirmation of payment.

The present invention provides, in another aspect, a method for the delivery to a mobile phone user of a service plan and phone number without said user having to directly communicate with a mobile network operator and without said user having to provide any personal details to any third party or to the mobile network operator which comprises:

packaging a service plan and phone number from a mobile network operator;

associating the plan and phone number with a non-provisioned Universal Integrated Circuit Card (UICC)

cueing service plan and phone number loading and activation of the UICC post purchase of the UICC by a user by at least one of 1) product code (for example, UPC) scanning; 2) SMS messaging; 3) messaging of ZIP Code; 4) IVR; 5) voice connection; 6) MMS and 7) data transmittal.

Pre-provisioned UICC

It is clear that, in some embodiments, there may be automatic activation of the service plan by the automatic triggering of an SMS message or the activation of the service plan by the automatic triggering of another communication means to activate the service plan (as described herein) and there is a plan (minutes, calling restrictions etc. . . . ) built into a service plan which pre-exists on the UICC. In this way, a user/customer purchases a particular UICC based upon the desired service plan required, for example, 7 day, 14 day, 21 day, 30 day, 60 day or 90 day plans, to name a few. Plans may also be bundled based upon the total number of minutes, messages and/or MBs available.

Two aspects of pre-provisioned UICC option of the present invention are fully described as follows:

a method for activating an unlocked, inactive mobile device operable on a GSM (Global System for Mobiles) standard, said method comprising: inserting a pre-provisioned Universal Integrated Circuit Card (UICC) in said mobile device, wherein said pre-provisioned UICC card includes at least a service/price plan and may include an activation application (in the alternative, other triggering means are employed), powering up the mobile device; detecting on the UICC card the home network to which the card is registered, the UICC activation application automatically directing the device to transmit at least one short message service (SMS) message to a provisioner, wherein said message requests automatic activation of the mobile device, the UICC activation application receiving confirmation from the provisioner, said confirmation enabling activation of the mobile device, and the instant application of the pre-provisioned service and price plan to said device.

a method for activating an unlocked, inactive mobile device operable on a CDMA (Code Division Multiple Access) standard, said method comprising: inserting a pre-provisioned Universal Integrated Circuit Card (UICC) in said mobile device, wherein said pre-provisioned UICC card includes at least a service/price plan, powering up the mobile device; detecting on the UICC card the home network to which the card is registered, the UICC card insertion and powering up triggering an activation application within the device to automatically direct the device to transmit at least one short message service (SMS) message to a provisioner, wherein said message requests automatic activation of the mobile device, the device activation application receiving confirmation from the provisioner, said confirmation enabling activation of the mobile device, and the instant application of the UICC card pre-provisioned service and price plan to said device.

Key Aspects and Considerations:

1) UICC (SIM Cards) send messages and then work with a messaging platform vendor to allow those messages to be passed to a provider's billing system.

2) The present invention provides an SMS based activation solution; however, throughout the industry, SMS will only work if the phone is active AND has an assigned phone number that is 10 digits. In the case of the present invention, there is no official phone number and the phone isn't activated so a key aspect of the present invention is this work around.

3) An "Application" (either on the SIM Card or embedded in a device) allows for an 'auto-activation' when the device is powered up for the first time with the new SIM Card installed. This activation application is not essential as long as other triggering means are provided and usable.

4) A mobile/cellular network provider must allow an unactivated device, in a state of suspension, to send at least one SMS transmission, once a UICC is inserted and upon triggering of Application.

In one aspect, the method and system of the present invention enables the mobile device to send a SMS (message) as soon as:

A) the device is powered up

B) the device detects the 'Home Network' of the carrier on which is UICC (for example SIM Card) is registered to by connecting to the nearest cellular tower While the Application of the present invention was developed for GSM phones it will work equally well in the CDMA market. The only difference is that the application will be in the device/phone software and not embedded within the SIM Card. The benefit is that the subscriber can basically activate his/her phone anywhere there is network. There is no other third party contact required for activation.

Application of Service Plan

Within the scope of the present invention a Service Plan is instantly applied to the UICC/SIM Card (equipment) thereby ending the need to register or sign up for 'service' once the UICC/SIM Card is installed and the device is powered on. Industry standard is that one must sign up for service with the provider. This is the reason that the commissioning structure in the industry is so complex.

Mobile service is sold and commissioned as a 'service' where the provider collects the money for service and also takes the risk for bad credit cards and chargebacks. In the industry today commissions are based on 'plans activated' and this leads to all the issues above. With this innovation, commissions are technically never paid because the price plan is embedded with the equipment and both are sold to the dealer at a wholesale cost. The dealer then sells the married pair to the customer at a retail price and keeps the difference. There is no way to have a 'chargeback' or a 'fraudulent activation' because commissions are paid.

By linking the price plan to the physical UICC/SIM Card in accordance with the present invention, wireless 'service' is no longer a service at all. It is a product that is really no different than a candy bar. It is sold to the dealer (retailer) and the retailer sells it to the customer with a mark-up. This means that 'anyone' can be a UICC/SIM Card dealer and that signing up dealers is as easy as selling someone the product in bulk.

Non-provisioned UICC

Preferred aspects of the non-provisioned UICC option of the present invention are fully described as follows:

- a method for activating an unlocked, inactive mobile device operable on a GSM (Global System for Mobiles) standard, said method comprising: acquiring a non-provisioned Universal Integrated Circuit Card (UICC), said UICC being capable of automatic activation for a chosen service/price plan; provisioning the UICC with the service/price plan by way of scanning a UPC code associated with the UICC, which scanning causes the delivery of a message to a service provisioner, wherein said message cues automatic activation of a mobile device into which UICC is inserted.
- a method for activating an unlocked, inactive mobile device operable on a GSM (Global System for Mobiles) standard, said method comprising: acquiring a non-provisioned Universal Integrated Circuit Card (UICC), said UICC being capable of automatic activation for a chosen service/price plan and a UICC activation application; provisioning the UICC with the service/price plan by way of scanning a UPC code associated with the UICC, which scanning causes the delivery of a message to a service provisioner, wherein said message cues automatic activation of a mobile device into which UICC is inserted and wherein UICC activation application receives confirmation from the provisioner, said confirmation enabling activation of the mobile device and the instant application of the service/price plan to said device.
- a method for activating an unlocked, inactive mobile device operable on a GSM (Global System for Mobiles) standard, said method comprising: acquiring a non-provisioned Universal Integrated Circuit Card (UICC), said UICC being capable of automatic activation for a chosen service/price plan; provisioning the UICC with the service/price plan by way of delivery of at least one short message service (SMS) to a provisioner, which SMS causes the delivery of a message to a service provisioner, wherein said message cues automatic activation of a mobile device into which UICC is inserted.
- a method for activating an unlocked, inactive mobile device operable on a GSM (Global System for Mobiles) standard, said method comprising: acquiring a non-provisioned Universal Integrated Circuit Card (UICC), said UICC being capable of automatic activation for a chosen service/price plan and a UICC activation application; provisioning the UICC with the service/price plan by way of delivery of at least one short message service (SMS) to a provisioner, which SMS causes the delivery of a message to a service provisioner, wherein said message cues automatic activation of a mobile device into which UICC is inserted and wherein UICC activation application receives confirmation from the provisioner, said confirmation enabling activation of the mobile device and the instant application of the service/price plan to said device.

Application of Service Plan

Within the scope of the present invention a Service Plan is instantly applied to the non-provisioned UICC/SIM Card (and device/equipment) thereby ending the need to register or sign up for 'service' once the UICC/SIM Card is installed and the device is powered on. Industry standard is that one must sign up for service with the provider. This is the reason that the commissioning structure in the industry is so complex.

In this particular embodiment of the invention, UICC or card "activation" may be integrated into the non-provisioned card. For example, a customer may select a non-provisioned card at a store, such card not needing to be stored behind a locked cabinet or otherwise secured as it is analogous to a non-loaded store gift card. Without being "loaded", it is of no value. There are a number of ways to "add value to" or load the card in accordance with this invention. In one aspect, upon the card being scanned for payment (for example via a UPC or UICC identifier scan), there is a triggering of an automatic message to a service plan provisioner, which provisioner remotely activates the selected service/price plan. Input of card retailer is no more onerous than scanning the card for purchase. Input of purchaser is no more onerous than selecting card (based on service/price plan, enabling scanning of card and of course insertion of card into mobile device. Risk to a retailer for theft is zero as there is no value to the card prior to self-activation, which is only triggered upon purchase.

In this another embodiment of the invention, UICC or card "activation" may be integrated into the non-provisioned card but the card has a plan pre-assigned to it, and is merely 'locked'. For example, a customer may select a non-provisioned but locked card with a service plan assigned at a store, such card not needing to be stored behind a locked cabinet or otherwise secured as it is analogous to a non-loaded store gift card. Without being "unlocked", it is of no value. There are a number of ways to "unlock" or load the card in accordance with this invention. In one aspect, upon the card being scanned for payment (for example via a UPC or UICC identifier scan), there is a triggering of an automatic message to a service plan provisioner, which provisioner remotely unlocks the UICC and thereby makes selected service/price plan provisionable. Input of card retailer is no more onerous than scanning the card for purchase.

Within these aspects of the invention, activation application may be integrated into the UICC. Upon purchase of the non-provisioned UICC by a user, the desired service/price plan needs to be both provisioned and activated and within the present invention, this is achieved "automatically" by one of the methods described above.

With this invention a new product is created and a new market will follow. The market that is created cannot exist without this greenfield product. It is fully anticipated that users/people who buy the UICC/Sim Card will buy it in addition to their 'normal' cell service. This way, the market is potentially millions of customers. The user base breaks down into several segments, of which the following are a few: the unbanked (no credit, no credit cards), the traveler (trying to get service while in the country), the privacy sector (people who do not want to give their 'real' number out which could include, matchmaking website users, classified ads placer, people who want to talk to sales people once, but don't want to get harassed later etc.), the temporary user (people who are running an office pool, or doing a weekend group activity that need phones, want to keep a SIM Card around 'just in case . . . etc.)

Figures

With reference to FIG. 1, an exemplary system 100 includes a computing device 120 at provisioner (Roam) biller 130, computing device 140 at aggregator (shown again as Roam) 150, computing device 160 at MNO provisioner 170, and computing device 180 at HLR 190. Also in FIG. 1 are shown SMSC 220, MSC 200, VLR 210, transmission antenna 230 and mobile device 240.

Each of said devices 120, 140, 160, 180, and 220 includes a processing unit (CPU or processor) and a system bus that couples various system components including the system memory such as read only memory (ROM) and random access memory (RAM) to the processor. Each device can include a cache of high-speed memory connected directly with, in close proximity to, or integrated as part of the processor. The system copies data from the memory and/or the storage device to the cache for quick access by the processor. In this way, the cache provides a performance boost that avoids processor delays while waiting for data. These and other modules can control or be configured to control the processor to perform various actions. Other system memory may be available for use as well. The memory can include multiple different types of memory with different performance characteristics. It can be appreciated that the disclosure may operate on a computing device with more than one processor or on a group or cluster of computing devices networked together to provide greater processing capability. The processor can include any general purpose processor and a hardware module or software modules stored in the storage device, configured to control the processor.

Each processor may essentially be a completely self-contained computing system, containing multiple cores or processors, a bus, memory controller, cache, etc. A multi-core processor may be symmetric or asymmetric.

A system bus may be any of several types of bus structures including a memory bus or memory controller, a peripheral bus, and a local bus using any of a variety of bus architectures. A basic input/output (BIOS) stored in ROM may provide the basic routine that helps to transfer information between elements within the computing devices, such as during start-up. The computing devices 120, 140, 160, 180, and 220 further include storage devices such as a hard disk drive, a magnetic disk drive, an optical disk drive, tape drive or the like. Each storage device can include software modules for controlling its respective processor. Each storage device (and in particular devices 120 and 140) may comprise one or more databases relating to a UICC, its number, its provisioning state, billing information and UICC expiry. Other hardware or software modules are contemplated. The storage device is connected to the system bus by a drive interface. The drives and the associated computer readable storage media provide non-volatile storage of computer readable instructions, data structures, program modules and other data for the computing device 100. In one aspect, a hardware module that performs a particular function includes the software component stored in a non-transitory computer-readable medium in connection with the necessary hardware components, such as the processor, bus, display and so forth, to carry out the function. The basic components are known to those of skill in the art and appropriate variations are contemplated depending on the type of device, such as whether the device is a small, handheld computing device, a desktop computer, or a computer server.

Although one embodiment described herein employs hard disk, those skilled in the art should appreciate that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment. Non-transitory computer-readable storage media expressly exclude media such as energy, carrier signals, electromagnetic waves, and signals per se.

The mobile device 240 (provisioned with a UICC) may communicate with SMS aggregator 150 and provisioner/biller 130 for purposes of activation via one or more servers, typically over a network 260. The network may be any private or public internetwork or other type of communications path but preferably is a MNO network 260.

Having disclosed some components of a computing system, the disclosure now turns to FIGS. 2-4, which illustrate the basic approach disclosed herein for automated message sequence, automated activation sequence and the SIM load process.

FIG. 2 illustrates an operation flow diagram of the automated message sequence whereby the UICC detects the appropriate network signal and uses that signal as a trigger to send the activation message. Additionally, an alternative manual flow is depicted where a subscriber actively sends a message to ensure the activation takes place. Both flows are supported within the context of this invention.

FIG. 3 illustrates an operation flow diagram of the automated activation sequence whereby the automated activation message is received and the appropriate msisdn is assigned with the appropriate price plan (features); Additionally this figure depicts an alternative flow that is automatically initiated in the event that an invalid message is received for activation, thereby eliminating failed activations; and FIG. 4 is illustrates the SIM load process that enables flexibility in assigning price plans to the UICCs such that inventory can be kept at minimum and new price plans can be added and on the shelves in a matter of days Computing Systems The various implementations of the method, device and system, and interaction between the mobile operators, UICC/SIM Card providers and users may be accomplished by the use of computing systems. As such, the systems and methods described herein rely on a variety of computer systems, networks and/or digital devices for operation. As will be appreciated by those skilled in the art, computing systems and web-based cross-platforms include non-transitory computer-readable storage media for tangibly storing computer readable instructions. In order to fully appreciate how this preferably web-based cross-platform application and system operates an understanding of suitable computing systems is useful and is provided herein.

In one aspect, a computer system (or digital device), which may be understood as a logic apparatus adapted and configured to read instructions from media and/or network port, is connectable to a server and can have a fixed media. The computer system can also be connected to the Internet or an intranet. The system includes central processing unit (CPU), disk drives, optional input devices, such as a keyboard and/or mouse and optional monitor. Data communication can be achieved through, for example, communication medium to a server at a local or a remote location. The communication medium can include any suitable means of transmitting and/or receiving data. For example, the communication medium can be a network connection, a wireless connection or an Internet connection.

It is envisioned that data relating to the present disclosure can be transmitted over such networks or connections. The computer system can be adapted to communicate with a participant and/or a device used by a participant. The computer system is adaptable to communicate with other computers over the Internet, or with computers via a server. Each computing device (including mobile devices) includes an operating system (OS), which is software, that consists of software programs and data that runs on the devices, manages the device hardware resources, and provides common services for execution of various application software. The operating system enables an application program to run on the device.

As will be appreciated by those skilled in the art, a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

A user launches an app created by an app creator and downloaded to the user's mobile device to view digital content items and can connect to a front end server via a network, which is typically the Internet, but can also be any network, including but not limited to any combination of a LAN, a MAN, a WAN, a mobile, wired or wireless network, a private network, or a virtual private network. As will be understood a very large numbers (e.g., millions) of users are supported and can be in communication with the website via an app at any time. The user may include a variety of different computing devices. Application delivery platform can be implemented entirely in hardware and/or a combination of hardware and/or software in execution. Further, application delivery platform can be incorporated within and/or associated with other compatible components. Additionally, application delivery platform can be, but is not limited to, any type of machine that includes a processor and/or is capable of effective communication with network topology and/or cloud. Illustrative machines that can comprise application delivery platform can include desktop computers, server class computing devices, laptop computers, notebook computers, Tablet PCs, consumer and/or industrial devices and/or appliances, hand-held devices, and the like.

Network topology and/or cloud can include any viable communication and/or broadcast technology, for example, wired and/or wireless modalities and/or technologies can be utilized to effectuate the claimed subject matter. Moreover, network topology and/or cloud 104 can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and/or distributed—and/or any combination, permutation, and/or aggregation thereof. Furthermore, as those skilled in the art will appreciate and understand various data communications protocols (e.g., TCP/IP, Ethernet, Asynchronous Transfer Mode (ATM), Fiber Distributed Data Interface (FDDI), Fibre Channel, Fast Ethernet, Gigabit Ethernet, Wi-Fi, Token Ring, Frame Relay, etc.) can be utilized to implement suitable data communications.

Additionally application delivery server/platform may include a provisioning component that, based at least in part on input received from a portal component, can automatically configure and/or provision the various disparate mobile devices with appropriate applications.

It is to be appreciated that a store can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). Store 206 of the subject systems and methods is intended to comprise, without being limited to, these and any other suitable types of memory. In addition, it is to be appreciated that the store can be a server, a database, a hard drive, and the like.

Server Modules, Components, and Logic

Certain embodiments are described herein as including logic or a number of modules, components or mechanisms. A module, logic, component or mechanism (hereinafter collectively referred to as a "module") may be a tangible unit capable of performing certain operations and is configured or arranged in a certain manner. In example embodiments, one or more computer systems (e.g. server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The invention can be implemented in numerous ways, including as a process, an apparatus, a system, a computer readable medium such as a computer readable storage medium or a computer network wherein program instructions are sent over optical or communication links. In this specification, these implementations, or any other form that the invention may take, may be referred to as systems or techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

The following discussion provides a brief and general description of a suitable computing environment in which various embodiments of the system may be implemented. Although not required, embodiments will be described in the general context of computer-executable instructions, such as program applications, modules, objects or macros being executed by a computer. Those skilled in the relevant art will appreciate that the invention can be practiced with other computing system configurations, including hand-held devices, multiprocessor systems, microprocessor-based or programmable consumer electronics, personal computers ("PCs"), network PCs, mini-computers, mainframe computers, mobile phones, personal digital assistants, smart phones, personal music players (like iPod) and the like. The embodiments can be practiced in distributed computing environments where tasks or modules are performed by remote processing devices, which are linked through a communications network. In a distributed computing environment, program modules may be located in both local and remote memory storage devices.

As used herein, the terms "computer" and "server" are both computing systems as described in the following. A computing system may be used as a server including one or more processing units, system memories, and system buses that couple various system components including system memory to a processing unit. Computing system will at times be referred to in the singular herein, but this is not intended to limit the application to a single computing system since in typical embodiments, there will be more than one computing system or other device involved. Other computing systems may be employed, such as conventional and personal computers, where the size or scale of the system allows. The processing unit may be any logic processing unit, such as one or more central processing units ("CPUs"), digital signal processors ("DSPs"), application-specific integrated circuits ("ASICs"), etc. Unless described otherwise, the construction and operation of the various components are of conventional design. As a result, such components need not be described in further detail herein, as they will be understood by those skilled in the relevant art.

The computing system includes a system bus that can employ any known bus structures or architectures, including a memory bus with memory controller, a peripheral bus, and a local bus. The system also will have a memory which may include read-only memory ("ROM") and random access memory ("RAM"). A basic input/output system ("BIOS"), which can form part of the ROM, contains basic routines that help transfer information between elements within the computing system, such as during startup.

The computing system also includes non-volatile memory. The non-volatile memory may take a variety of forms, for example a hard disk drive for reading from and writing to a hard disk, and an optical disk drive and a magnetic disk drive for reading from and writing to removable optical disks and magnetic disks, respectively. The optical disk can be a CD-ROM, while the magnetic disk can be a magnetic floppy disk or diskette. The hard disk drive, optical disk drive and magnetic disk drive communicate with the processing unit via the system bus. The hard disk drive, optical disk drive and magnetic disk drive may include appropriate interfaces or controllers coupled between such drives and the system bus, as is known by those skilled in the relevant art. The drives, and their associated computer-readable media, provide non-volatile storage of computer readable instructions, data structures, program modules and other data for the computing system. Although computing systems may employ hard disks, optical disks and/or magnetic disks, those skilled in the relevant art will appreciate that other types of non-volatile computer-readable media that can store data accessible by a computer may be employed, such a magnetic cassettes, flash memory cards, digital video disks ("DVD"), Bernoulli cartridges, RAMs, ROMs, smart cards, etc.

Various program modules or application programs and/or data can be stored in the system memory. For example, the system memory may store an operating system, end user application interfaces, server applications, and one or more application program interfaces ("APIs").

The system memory also includes one or more networking applications, for example a Web server application and/or Web client or browser application for permitting the computing system to exchange data with sources, such as clients operated by users and members via the Internet, corporate Intranets, or other networks as described below, as well as with other server applications on servers such as those further discussed below. The networking application in the preferred embodiment is markup language based, such as hypertext markup language ("HTML"), extensible markup language ("XML") or wireless markup language ("WML"), and operates with markup languages that use syntactically delimited characters added to the data of a document to represent the structure of the document. A number of Web server applications and Web client or browser applications are commercially available, such as those available from Mozilla and Microsoft.

The operating system and various applications/modules and/or data can be stored on the hard disk of the hard disk drive, the optical disk of the optical disk drive and/or the magnetic disk of the magnetic disk drive.

A computing system can operate in a networked environment using logical connections to one or more client computing systems and/or one or more database systems, such as one or more remote computers or networks. The computing system may be logically connected to one or more client computing systems and/or database systems under any known method of permitting computers to communicate, for example through a network such as a local area network ("LAN") and/or a wide area network ("WAN") including, for example, the Internet. Such networking environments are well known including wired and wireless enterprise-wide computer networks, intranets, extranets, and the Internet. Other embodiments include other types of communication networks such as telecommunications networks, cellular networks, paging networks, and other mobile networks. The information sent or received via the communications channel may, or may not be encrypted. When used in a LAN networking environment, the computing system is connected to the LAN through an adapter or network interface card (communicatively linked to the system bus). When used in a WAN networking environment, the computing system may include an interface and modem (not shown) or other device, such as a network interface card, for establishing communications over the WAN/Internet.

In a networked environment, program modules, application programs, or data, or portions thereof, can be stored in the computing system for provision to the networked computers. In one embodiment, the computing system is communicatively linked through a network with TCP/IP middle layer network protocols; however, other similar network protocol layers are used in other embodiments, such as user datagram protocol ("UDP"). Those skilled in the relevant art will readily recognize that these network connections are only some examples of establishing communications links between computers, and other links may be used, including wireless links.

While in most instances the computing system will operate automatically, where an end user application interface is provided, an operator can enter commands and information into the computing system through an end user application interface including input devices, such as a keyboard, and a pointing device, such as a mouse. Other input devices can include a microphone, joystick, scanner, etc. These and other input devices are connected to the processing unit through the end user application interface, such as a serial port interface that couples to the system bus, although other interfaces, such as a parallel port, a game port, or a wireless interface, or a universal serial bus ("USB") can be used. A monitor or other display device is coupled to the bus via a video interface, such as a video adapter (not shown). The computing system can include other output devices, such as speakers, printers, etc.

The present methods, systems and articles also may be implemented as a computer program product that comprises a computer program mechanism embedded in a computer readable storage medium. For instance, the computer program product could contain program modules. These program modules may be stored on CD-ROM, DVD, magnetic disk storage product, flash media or any other computer readable data or program storage product. The software modules in the computer program product may also be distributed electronically, via the Internet or otherwise, by transmission of a data signal (in which the software modules are embedded) such as embodied in a carrier wave.

For instance, the foregoing detailed description has set forth various embodiments of the devices and/or processes via the use of examples. Insofar as such examples contain one or more functions and/or operations, it will be understood by those skilled in the art that each function and/or operation within such examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, flash drives and computer memory; and transmission type media such as digital and analog communication links using TDM or IP based communication links (e.g., packet links).

Further, in the methods taught herein, the various acts may be performed in a different order than that illustrated and described. Additionally, the methods can omit some acts, and/or employ additional acts. As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

While certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

EXAMPLES

Example 1

Customer Purchase of SIM Card—Use of US ZIP Code

1. Customer inserts SIM card into device
2. Customer powers up device

3. SIM Application also sends an additional SMS that is held in an activation queue by provisioner (Roam Mobility) systems for 7 minutes awaiting the customer to send a message (ZIP Code)
4. Customer texts US Based ZIP to short code 7850
5. SMS aggregator delivers SMS(s) to Roam Mobility systems
6. Roam Mobility systems see SIM Application based SMS and the customer based SMS and then disregards SMS sent by SIM Application
7. Roam Mobility systems pull a dummy (temporary) MISDN, lookup SIM number and activate it with pre-assigned price plan and phone number based on the ZIP Code submitted by the customer
8. (alternative) If an invalid ZIP Code is sent, the Roam Mobility system assigns 'default' ZIP CODE and resends the activation call.
9. SIM Card is now active with a price plan and local number
10. Roam Mobility system receives activation confirmation from the SIM Card via the handset
11. Roam Mobility system sends a confirmation SMS to the new phone number informing customer of activation, phone number and expiry date of their plan.

Example 2

Customer Purchase of SIM Card—when a ZIP Code is NOT Entered

1. Customer inserts SIM card into device
2. Customer powers up device
3. SIM Application also sends an additional SMS that is held in an activation queue by Roam Mobility systems for 7 minutes awaiting the customer to send a message (ZIP Code)
4. Customer does NOT send a ZIP Code to short code 7850
5. SMS aggregator delivers the SIM Application SMS to Roam Mobility systems after 7 minutes
6. Roam systems acknowledges the SIM Application SMS and waits an additional 5 minutes for customer to send a ZIP Code to shortcode 7850
7. After 5 minutes Roam Mobility systems pulls a dummy (temporary) MISDN, lookup SIM number and activate it with pre-assigned price plan and 'default' ZIP Code.
8. SIM Card is now active with a price plan and a valid phone number
9. Roam Mobility system receives activation confirmation from the SIM Card via the handset
10. Roam Mobility system sends a confirmation SMS to the new phone number informing customer of activation, phone number and expiry date of their plan.

Example 3

Customer Purchase Experience: Standard Model with No Point of Sale Activation (POSA) Connection 1. Customer selects the appropriate SIM Card at the retailer based on the plan they require
2. Sales Associate scans the bar code/UPC at the register
3. Customer inserts SIM card into device
4. Customer powers up device
5. SIM Application also sends an additional SMS that is held in an activation queue by Roam Mobility systems for 7 minutes awaiting the customer to send a message (ZIP Code)
6. Customer texts US Based ZIP to short code 7850
7. SMS aggregator delivers SMS(s) to Roam Mobility systems
8. Roam Mobility systems see SIM Application based SMS and the customer based SMS and then disregards SMS sent by SIM Application
9. Roam Mobility systems pull a dummy (temporary) MISDN, lookup SIM number and activate it with pre-assigned price plan and phone number based on the ZIP Code submitted by the customer
10. (alternative) If an invalid ZIP Code is sent, the Roam Mobility system assigns 'default' ZIP CODE and resends the activation call.
11. SIM Card is now active with a price plan and local number
12. Roam Mobility system receives activation confirmation from the SIM Card via the handset
13. Roam Mobility system sends a confirmation SMS to the new phone number informing customer of activation, phone number and expiry date of their plan.

Example 4

Standard Model with a Point of Sale Activation (POSA) Connection

1. Retailer purchase only for SIM Card (hardware) from supplier
2. SIM Cards are shipped to retailer assigned with plans, but contain a 'blocking flag' that prevents activation if the SIM Card is stolen
3. Roam Mobility loads all SIMs with 'blocking flag' and a price plan
4. Customer selects the appropriate SIM Card at the retailer based on the plan they require
5. Sales Associate scans the bar code/UPC at the register
6. The SIM Card has a unique barcode identifier embedded in it and is sent via backend POSA systems to Roam Mobility
7. Roam Mobility validates price plan against SIM Card number received via the POSA connection
8. Roam Mobility removes the 'blocking flag' in its system database
9. Customer pays for the SIM Card they have selected
10. SIM Card is not 'active' but ready for self activation, it can be activated later at any time in the future (up to 2 years)
11. For every SIM Card that is 'unblocked' retailer must pay Roam Mobility for full value of that plan minus the SIM price and commission Example 5

"Candy Bar" Model Purchase with a Point of Sale Activation (POSA) Connection

1. Retailer purchase only for SIM Card (hardware) and price plan from supplier
2. SIM Cards are shipped to retailer assigned with plans, but contain a 'blocking flag' that prevents activation if the SIM Card is stolen
3. Roam Mobility loads all SIMs with 'blocking flag' and a price plan
4. Customer selects the appropriate SIM Card at the retailer based on the plan they require
5. Sales Associate scans the bar code/UPC at the register 6. The SIM Card has a unique barcode identifier embedded in it and is sent via backend POSA systems to Roam Mobility
7. Roam Mobility validates price plan against SIM Card number received via the POSA connection
8. Roam Mobility removes the 'blocking flag' in its system database
9. Customer pays for the SIM Card they have selected
10. SIM Card is not 'active' but ready for self activation, it can be activated later at any time in the future (up to 2 years)
11. For every SIM Card that is 'unblocked' has no more fees to Roam Mobility and enjoys higher margins

We claim:

1. A system for a provisioner to activate an unlocked, inactive mobile device with a Universal Integrated Circuit Card (UICC), comprising:
 a mobile device;
 a computer server for communicating with the mobile device;
 a searchable database comprising a plurality of service/price/feature plans for UICCs, a look-up table comprising links to the said plurality of service/price/feature plans for UICCs and respective enabled to be provisioned UICCs, and searching means for said database;
 a provisioner programmed to:
  receive and process a triggering application request from the mobile device, signaling that it is powered up, live in a mobile network and requiring automatic activation;
  identify the mobile device via a specific UICC inserted in the mobile device;
  automatically look up an assigned plan for the specific UICC, using the look up table, said plan being locatable in the database;
  automatically activate the mobile device with the looked-up plan;
  if required, adjust service/price/feature plans stored in the database;
 a communications network between the powered up mobile device, the computer server, database, the look-up table and processor.

2. The system of claim 1 wherein the mobile device comprises an activation application, which, upon powering up the mobile device:
 detects on the UICC a home network to which the UICC is registered;
 directs the mobile device to transmit at least one message to a provisioner processor, via the computer server, wherein said message requests automatic activation of the mobile device; and
 receives confirmation from the provisioner processor, said confirmation enabling activation of the mobile device, and the instant application of the located plan to the mobile device.

3. The system of claim 1 wherein mobile device comprises an activation application, which, upon powering up mobile device:
 detects on the UICC a home network to which the UICC is registered;
 directs the mobile device to transmit at least one message to a provisioner processor, via the computer server, comprising at least one zip code, wherein said message requests automatic activation of the mobile device; and
 receives confirmation from the provisioner processor, said confirmation enabling activation of the mobile device, provision of a phone number based on zip code transmitted and automatic activation of the located plan to the mobile device.

4. The system of claim 1 wherein the powered up mobile device communicates with provisioner processor via interactive voice response (IVR) technology enabled by the UICC.

5. The system of claim 1 comprising network detection software which recognizes the UICC, detects a home network to which the UICC is registered and communicates with provisioner processor to automatically look up the located plan and to activate the mobile device with the located plan.

6. The system of claim 1 wherein UICC comprises an activation application which detects a home network to which the UICC is registered and communicates with provisioner processor to automatically look up the located plan and to activate the mobile device with the located plan.

7. The system of claim 1 wherein if no zip code or an invalid zip code is transmitted, the provisioner processor is further programmed to assign a default zip code for association with a phone number for the mobile device.

8. The system of claim 1 wherein UICC is a SIM card.

9. The system of claim 1 wherein UICC was purchased by a user separate and apart from the mobile device.

10. The system of claim 1 wherein UICC was purchased by a user from a source selected from the group consisting of vending machines, car rental offices, tourist establishments, hotels/motels, amusement parks, stores, airports, and transportation stations.

11. The system of claim 1 wherein the activation application directs transmissions to provisioner processor even in the absence of the mobile device having an assigned phone number.

12. The system of claim 1 wherein the provisioner is a third party in communication with a mobile network operator and user, who is a purchaser of UICC.

* * * * *